United States Patent
Schweitzer et al.

(10) Patent No.: US 11,802,195 B2
(45) Date of Patent: Oct. 31, 2023

(54) RUBBER COMPOSITION AND A TIRE

(71) Applicant: The Goodyear Tire & Rubber Company, Akron, OH (US)

(72) Inventors: Claude Schweitzer, Colmar-Berg (LU); Cecilia Aguiar Da Silva, Helmsange (LU); Marc-André Robert Paulus, Wemperhardt (LU); Marc Antoine Norbert Hédo, Colmar-Berg (LU); Serge Guillaume Feltes, Hagondange (FR); Stefano Picchiotti, Colmar-Berg (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 17/657,251

(22) Filed: Mar. 30, 2022

(65) Prior Publication Data

US 2023/0033878 A1 Feb. 2, 2023

Related U.S. Application Data

(60) Provisional application No. 63/158,506, filed on Mar. 9, 2021.

(51) Int. Cl.
*C08L 9/06* (2006.01)

(52) U.S. Cl.
CPC ........... *C08L 9/06* (2013.01); *C08L 2205/025* (2013.01); *C08L 2205/035* (2013.01)

(58) Field of Classification Search
CPC ........................................................ C08L 9/06
USPC ........................................................ 524/492
See application file for complete search history.

(56) References Cited

U.S. PATENT DOCUMENTS

| | | | |
|---|---|---|---|
| 5,901,766 A | 5/1999 | Sandstrom et al. | |
| 9,441,098 B1 | 9/2016 | Isitman et al. | |
| 9,757,987 B2 | 9/2017 | Jacoby et al. | |
| 10,364,342 B2 | 7/2019 | Brace | |
| 10,519,300 B2 | 12/2019 | Brace | |
| 10,626,254 B1 * | 4/2020 | Delville | C08K 3/30 |
| 10,821,777 B2 | 11/2020 | Isitman et al. | |
| 2013/0338256 A1 | 12/2013 | Steiner et al. | |
| 2015/0283854 A1 | 10/2015 | Saintigny et al. | |
| 2015/0343843 A1 * | 12/2015 | Cato | C08K 3/06 524/526 |
| 2016/0376427 A1 | 12/2016 | Sandstrom et al. | |
| 2017/0037225 A1 | 2/2017 | Isitman et al. | |
| 2017/0051135 A1 | 2/2017 | Sandstrom et al. | |
| 2017/0166732 A1 | 6/2017 | Isitman et al. | |
| 2017/0232795 A1 | 8/2017 | Isitman et al. | |
| 2018/0154696 A1 | 6/2018 | Isitman et al. | |
| 2019/0062534 A1 * | 2/2019 | Broemmel | C08L 9/06 |
| 2019/0062537 A1 * | 2/2019 | Mejia | C08K 5/5419 |
| 2019/0225778 A1 | 7/2019 | Weydert et al. | |
| 2019/0330452 A1 | 10/2019 | Isitman et al. | |
| 2019/0389995 A1 | 12/2019 | Watanabe | |
| 2020/0048439 A1 | 2/2020 | Ganesan et al. | |
| 2020/0071506 A1 * | 3/2020 | Steiner | C08L 9/06 |
| 2020/0094623 A1 | 3/2020 | Isitman | |

FOREIGN PATENT DOCUMENTS

| | | | |
|---|---|---|---|
| EP | 2455232 A1 | | 5/2012 |
| EP | 3385091 A | * | 10/2018 |
| EP | 3450206 A1 | | 3/2019 |
| WO | 2017104781 A1 | | 6/2017 |

OTHER PUBLICATIONS https://www.drt.fr/en/markets/dercolyte-a-115/ (Date Unknown).*
https://omnexus.specialchem.com/product/r-the-goodyear-tire-rubber-company-budene-1223 (Date Unknown).*
European Search Report for Serial No. EP22159610 dated Jun. 7, 2022.

* cited by examiner

*Primary Examiner* — Deve V Hall
(74) *Attorney, Agent, or Firm* — Mandy B. Willis

(57) ABSTRACT

In a first aspect, the present invention is directed to a rubber composition comprising, based on 100 parts by weight of elastomer (phr), 70 phr to 95 phr of diene based elastomer, wherein said diene based elastomer comprises 25 phr to 60 phr of a first diene based elastomer having a glass transition temperature within a range of −49° C. to −15° C., and 10 phr to 45 phr of a second diene based elastomer having a glass transition temperature within a range of −50° C. to −110° C., 5 phr to 30 phr of one or more of natural rubber and synthetic polyisoprene rubber, 40 phr to 70 phr of silica, and 10 phr to 40 phr of at least one terpene resin having a weight average molecular weight (Mw) of at least 900 g/mol. In another aspect, the present invention is directed to tire comprising a tire tread with aforementioned rubber composition.

20 Claims, 1 Drawing Sheet

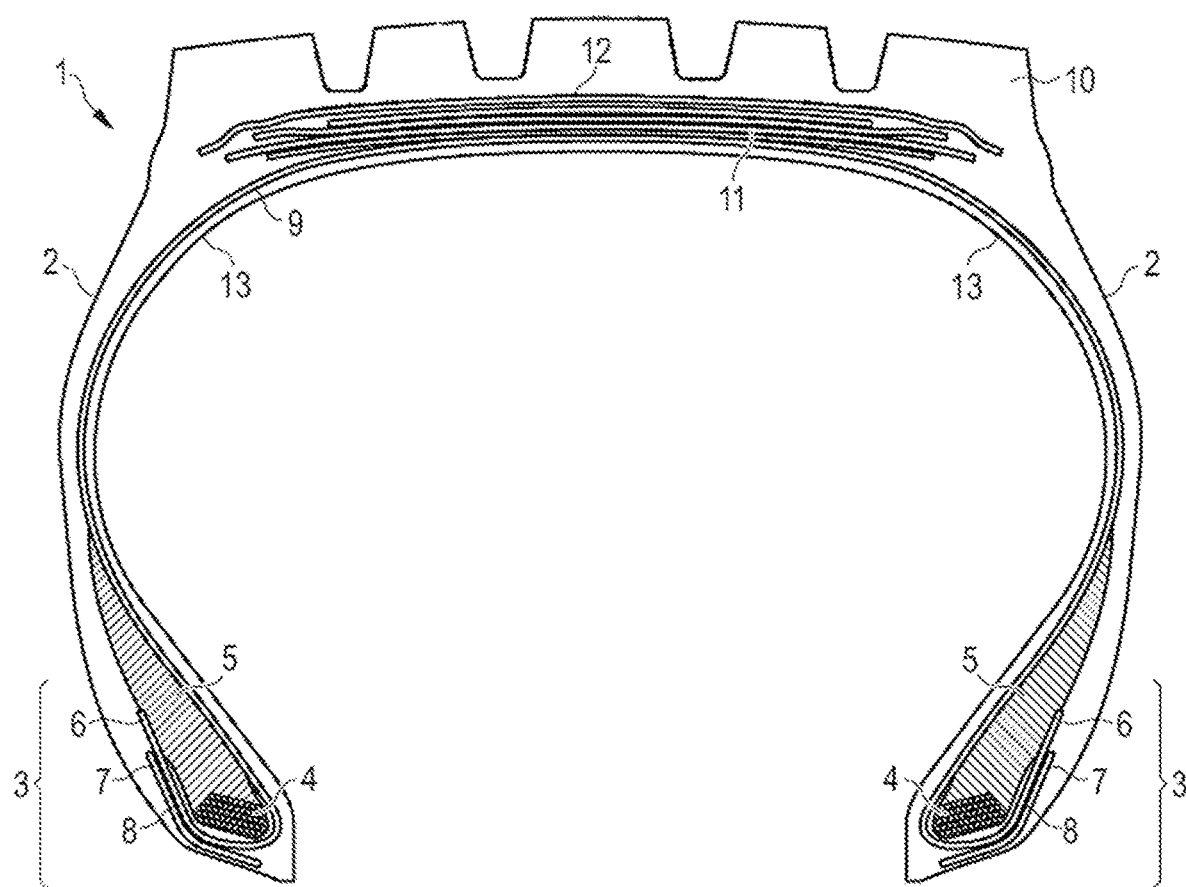

RUBBER COMPOSITION AND A TIRE

FIELD OF THE INVENTION

The present invention is directed to a rubber composition, in particular a tread rubber composition. Moreover, the present invention is directed to a tire comprising a rubber composition, especially a tire comprising a tread with said rubber composition.

BACKGROUND

As known in the tire art, it has traditionally been difficult to improve multiple tire characteristics at the same time without considerable trade-offs in at least another characteristic. One of such conflicts exists between rolling resistance and wet performance. When rolling resistance is to be improved, there are typically trade-offs in wet grip. However, limiting rolling resistance is crucial to increase energy efficiency.

Moreover, there may be further preferences of tire performance depending on the type of vehicle equipped with the tires. In particular, it may be desirable for some SUV tires to reduce the maximum lateral force achieved during tire force & moment tests or maneuvers. In particular, rollovers shall be avoided which may have a higher probability for vehicles having a relatively high center of mass. In particular, a low maximum lateral force can be associated with a limited rollover probability. Despite of the desire to reduce the maximum lateral force, lateral forces of the tire shall nevertheless be relatively high at limited slip angles of the tire. In other words, high cornering stiffness is desired despite the wish to limit the tire's maximum lateral force in such cases.

The development of the balance of lateral maximum force, cornering stiffness and/or wet grip as well as rolling resistance of tires leaves still room for improvement.

SUMMARY OF THE INVENTION

A first object of the invention may be to provide a rubber composition with advanced hysteresis and/or wet traction.

A second object of the present invention may be to provide a tire having a tread rubber composition supporting a limited rollover probability.

A third object of the invention may be to provide a tire having a limited maximum lateral force and optionally an advanced cornering stiffness before reaching its maximum lateral force.

A further object of the invention may be to provide a tire having one or more of a limited maximum lateral force and an advanced cornering stiffness, and at the same time good rolling resistance and wet traction.

The present invention is defined by the scope of the independent claims. Preferred embodiments are provided in the dependent claims as well as in the summary of the invention hereinbelow.

Thus, in a first aspect of the invention, a rubber composition is provided, wherein the rubber composition comprises 70 phr to 95 phr of diene based elastomer, said diene based elastomer comprising 25 phr to 60 (preferably to 50) phr of a first diene based elastomer having a glass transition temperature (Tg) within a range of −49° C. to −15° C., and 10 (preferably 20) phr to 45 phr of a second diene based elastomer having a glass transition temperature within a range of −50° C. (or −51° C.) to −110° C., 5 phr to 30 phr of one or more of natural rubber and synthetic polyisoprene, 40 phr to 70 phr of silica, and 10 phr to 40 phr of at least one terpene resin having a weight average molecular weight (Mw) of at least 900 g/mol.

In particular, the inventors have found that the relatively low filler (in particular silica) content and a relatively high content of said resin with a relatively large molecular weight limits the maximum (or in other words peak) lateral force and supports thereby avoiding rollovers. In particular, the inventors have found that the maximum lateral force decreases with decreasing compound stiffness (e.g. supported by a limited filler content) and a high weight average molecular weight of the deployed resin.

In still another embodiment the resin has a weight average molecular weight Mw of at least 1000 g/mol, 1100 g/mol, 1500 g/mol, 1700 g/mol, 1900 g/mol, 2000 g/mol, 2100 g/mol, 2200 g/mol, 2300 g/mol or at least 2400 g/mol. Preferably, the weight average molecular weight Mw is at most 4000 g/mol, or even more preferably at most 3000 g/mol.

In still another embodiment, the rubber composition comprises from 45 phr to 65 phr of the silica. In particular, in view of the findings of the inventors, higher amounts result in less limited maximum lateral force. Lower amounts are less desirable from a stiffness and/wet performance perspective.

In one embodiment, the silica has a BET surface area within a range of 170 $m^2/g$ to 260 $m^2/g$. In particular, such a high surface area supports a high compound stiffness, especially in view of the relatively limited silica amount.

In another embodiment, the silica comprises a BET surface area within a range of 210 $m^2/g$ to 260 $m^2/g$. Such an even higher surface area is most preferred to further increase the compound stiffness.

In still another embodiment, the resin has a softening point within a range of 100° C. to 150° C. In particular, resins with a low softening point are less desirable for the present compositions. Moreover, the above upper limit has also been found to be preferable by the inventors. In still another embodiment, the resin has a softening point within a range of 110° C. to 140° C.

In yet another embodiment, the resin is a beta terpene resin. In general beta terpene resins are preferred for use in most applications. Terpene phenol resins have typically been found to be less preferable for use in most cases.

In yet another embodiment, the rubber composition comprises one or more of: from 0.1 phr to 10 phr (preferably 1 phr to 5 phr) of carbon black; from 4 phr to 7 phr of silane; and from 0 phr to 10 phr of oil (preferably less than 8 phr of oil). Thus, the composition comprises preferably a limited carbon black content to provide an advanced wet performance. Moreover, the amount of oil is preferably also limited, in particular to improve the wet performance rolling resistance balance.

In still another embodiment, the rubber composition comprises from 35 phr to 50 phr of the first diene based elastomer, wherein the first diene based elastomer is a first styrene butadiene rubber having a glass transition temperature within a range of −49° C. to −15° C. Furthermore, the compound may comprise from 25 phr to 40 phr of the second diene based elastomer comprising one or more of polybutadiene and a second styrene butadiene rubber, and/or from 10 phr to 25 phr of natural rubber or synthetic polyisoprene. In particular, these rubber components help to achieve a relatively high compound Tg which is preferred from a wet performance perspective. The mentioned amount of natural rubber and/or polyisoprene helps to provide desirable tensile properties.

In still another embodiment, the rubber composition comprises a blocked mercapto silane, preferably within a range of 4 phr to 7 phr. In a preferred example, the silane is 3-Octanoylthio-1-propyltriethoxysilane. The use of this silane can further help to improve the rolling resistance properties of the present composition.

In still another embodiment, said first diene based elastomer is a styrene butadiene rubber, preferably a solution polymerized styrene butadiene rubber, comprising a functional group configured for or adapted to the coupling to the silica.

In still another embodiment, said first styrene butadiene rubber is end chain functionalized with one or more of an polysiloxy, alkylsiloxy, aminoalkylsiloxy, tin amino, amino silane, and amino siloxane group.

In still another embodiment, the first styrene butadiene rubber is end chain functionalized with an amino silane group and wherein the second styrene butadiene rubber is end chain functionalized with an amino siloxane group.

In still another embodiment, the first styrene butadiene rubber has a glass transition temperature within a range of −25° C. to −35° C. and the second styrene butadiene rubber has a glass transition temperature within a range of −51° C. and −70° C.

In yet another embodiment, the second diene based elastomer is a polybutadiene having a glass transition temperature within a range of −104° C. and −110° C. Provision of the polybutadiene further helps to increase the cornering stiffness of the tire (below the maximum lateral force) and provides improved tire treadwear characteristics.

In still another embodiment, the rubber composition comprises from 15 phr to 35 phr of the resin, preferably from 15 phr to 30 phr of the resin. In particular, the resin amount shall be limited in such an embodiment to avoid a limited cornering stiffness In still another embodiment, the rubber composition comprises 1,6-bis(N,N-dibenzylthiocarbamoyldithio)hexane. In particular, this cross-linking agent is deemed to further improve the abrasion resistance of the rubber composition in accordance with one or more of the aforementioned embodiments. This property is also deemed of particular relevance for SUV tires.

In still another embodiment, the resin is selected from terpene resins which are free of aromatic modifications or groups.

In yet another embodiment, the glass transition temperature of the rubber composition is within a range of −25° C. and −15° C., preferably in a range of −20° C. and −15° C., or even more preferably within a range of −18° C. and −16° C.

In an embodiment, the rubber composition may include at least one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 percent to 31 percent. By emulsion polymerization prepared styrene-butadiene rubber (ESBR), it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared (or solution polymerized) SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene. In another embodiment a second SSBR may have a bound styrene content of 5% to 30%, preferably 5% to 20%.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95 to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer or elastomer composition, where referred to herein, represents the glass transition temperature(s) of the respective elastomer in its uncured state or a cured state in the case of an elastomer composition. A Tg is determined herein as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 to 5 phr, of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound" and "composition" and "formulation" may be used herein interchangeably, unless indicated otherwise.

In another embodiment, the rubber composition includes one or more resins, preferably having a glass transition temperature Tg greater than 20° C., preferably greater than 60° C. A Tg for resins is determined as a peak midpoint by a differential scanning calorimeter (DSC) at a temperature rate of increase of 10° C. per minute, according to ASTM D6604 or equivalent. Preferably, the resin has a softening point above 100° C. as determined by ASTM E28 which might sometimes be referred to as a ring and ball softening point.

Terpene resins are preferably comprised of polymers of at least one of limonene, alpha pinene, beta pinene ("beta terpene") and delta-3-carene, whereas terpene-phenol resins may be derived by copolymerization of phenolic monomers with terpenes such as limonenes, pinenes and delta-3-carene.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition may also include less than 10 phr of oil, preferably less than 5 phr.

In an embodiment, the rubber composition includes silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g., sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. In the embodiments of the present invention said surface areas is preferably relatively high. The BET surface area is determined according to ASTM D6556 or equivalent and is described in the Journal of the American Chemical Society, Volume 60, Page 304 (1930).

In still another embodiment, the rubber composition may comprise pre-silanized and precipitated silica. In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl poly sulfides and organomercaptoalkoxysilanes.

In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731, the teachings of which are incorporated herein for the purpose of describing pre-hydrophobated precipitated silica and techniques for making such pre-hydrophobated precipitated silica.

In another embodiment, said pre-silanized precipitated silica is precipitated silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane. The mercaptosilane with its SH groups may improve compatibility with the rubber material or rubber matrix and/or support the curing process. Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries.

In an embodiment, the rubber composition is exclusive of addition of (added) precipitated silica to the rubber composition (thereby exclusive of addition of non-pre-silanized precipitated silica).

In one embodiment of this invention the rubber composition can include carbon black. Some representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 cm³/100 g to 150 cm³/100 g. Iodine absorption values can be suitably determined according to ASTM D1510 or equivalent.

In one embodiment, the rubber composition may contain sulfur containing organosilicon compounds or silanes. Examples of suitable sulfur containing organosilicon compounds are of the formula:

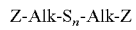

in which Z is selected from the group consisting of

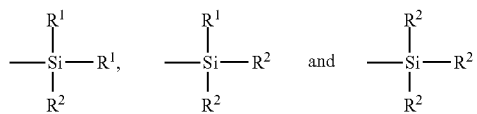

where R¹ is an alkyl group of 1 to 4 carbon atoms, cyclohexyl or phenyl; R² is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

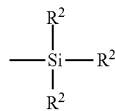

where R² is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one preferred embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 5 phr, usually 1 phr to 5 phr. However, in a preferred embodiment the composition is free of such tackifier resins. Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. In many cases microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

In a second aspect of the present invention, a tire is provided, the tire comprising the rubber composition of the first aspect and/or one of its embodiments.

In one embodiment the tire comprises a tire tread and the tire tread comprises the rubber composition.

In another embodiment the tire is a summer tire and/or a SUV tire.

In another embodiment, the tire of the present invention may for example be a pneumatic tire or non-pneumatic tire. The tire may also be a radial or bias ply tire.

In an embodiment, vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

It is emphasized that one or more aspects, embodiments, or features thereof, may be combined with one another within the scope of the present invention.

BRIEF DESCRIPTION OF THE DRAWINGS

The structure, operation, and advantages of the invention will become more apparent upon contemplation of the following description taken in conjunction with the accompanying drawing, wherein:

FIG. 1 is a schematic cross section of a tire comprising a tread and further rubber components.

DETAILED DESCRIPTION OF THE EMBODIMENTS

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The tread 10 comprises one or more tread compounds as described herein in accordance with embodiments of the invention.

While the embodiment of FIG. 1 suggests a plurality of tire components including for instance apexes 5, chippers 7, flippers 8 and an overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves. In particular, in an embodiment the present invention is directed to a tire comprising a tread 10 and/or the specific rubber composition comprised therein. The present invention shall not be limited to the example of the tire 1 depicted and described in accordance with FIG. 1.

Preferred examples of a rubber composition for a tire tread, which are in accordance with preferred embodiments of the invention are shown in TABLE 1 below as Inventive Examples 1 to 3 in comparison with a Control Sample. The Inventive Examples comprise a high molecular weight terpene resin whereas the Control Sample comprises a relatively low molecular weight terpene phenol resin. As a result of experiments of the inventors, the compositions comprise a limited, essentially silica based filler amount, wherein high surface area silica has turned out to be most preferable. All rubber compositions comprise a high Tg functionalized SSBR, natural rubber and another low Tg diene based rubber. The Control Sample and Inventive Examples 1 and 3 comprise a low Tg SSBR. Inventive Example 2 comprises a low Tg PBR instead. Silane 1 has been added as deemed most suitable from a low rolling resistance perspective.

TABLE 1

| Ingredient | Control Sample | Inventive Example 1 | Inventive Example 2 | Inventive Example 3 |
|---|---|---|---|---|
| | | phr | | |
| SSBR[1] | 40 | 45 | 45 | 40 |
| SSBR[2] | 42 | 36.75 | 0 | 42 |
| Natural Rubber | 20 | 20 | 20 | 20 |
| PBR 2[3] | 0 | 0 | 35 | 0 |
| Silica 1[4] | 57 | 0 | 0 | 57 |
| Silica 2[5] | 0 | 57 | 57 | 0 |
| Silane 1[6] | 4.6 | 4.6 | 4.6 | 4.6 |
| Silane 2[7] | 1 | 1 | 1 | 1 |
| Resin 1[8] | 0 | 21 | 23 | 30 |
| Resin 2[9] | 30 | 0 | 0 | 0 |
| BDBzTH[10] | 2.2 | 2.2 | 2.2 | 2.2 |
| Antidegradants[11] | 3 | 3 | 3 | 3 |
| Waxes | 3 | 3 | 3 | 3 |
| Sulfur | 0.6 | 0.75 | 0.75 | 0.6 |
| Carbon Black | 1 | 1 | 1 | 1 |
| Accelerators[12] | 2.9 | 2.9 | 2.9 | 2.9 |
| Stearic Acid | 2 | 2 | 2 | 2 |
| Zinc Oxide | 1.1 | 1.1 | 1.1 | 1.1 |

[1]Solution-polymerized styrene butadiene rubber as HPR355H from JSR having a Tg of −27° C.
[2]Solution-polymerized styrene butadiene rubber as F1038 from LG Chem having a Tg pf −62° C., with 5% oil extension by weight
[3]Cis-1,4 polybutadiene rubber as Budene™ 1223 from the Goodyear Tire and Rubber Company, having a Tg of −108° C.
[4]Precipitated silica as Zeosil™ Premium 200MP with a BET surface area of about 215 $m^2/g$
[5]Precipitated silica as Ultrasil™ 9100 GR with a BET surface area of about 235 $m^2/g$
[6]3-Octanoylthio-1-propyltriethoxysilane as NXT from Momentive
[7]Bis-triethoxysilylpropyl tetrasulfide as SI 69 from Evonik
[8]Polyterpene resin based on beta-pinene as Sylvatraxx™ 4150 from Arizona Chemical having a Mw of 2200 g/mol and a softening point of 115° C.
[9]Terpene phenol resin as Polyster T160 from Yasahura Chemicals having a Mw of 800 g/mol and a softening point of 160° C.

TABLE 1-continued

| Ingredient | Control Sample | Inventive Example 1 | Inventive Example 2 | Inventive Example 3 |
|---|---|---|---|---|
| | | phr | | |

[10] 1,6-bis(N,N-dibenzylthiocarbamoyldithio)hexane as Vulcuren™ from Lanxess
[11] Mixed p-phenylene diamine type
[12] Sulfenamide and guanidine types TABLE 2 shows physical measurement data of the cured compositions provided above in TABLE 1.

Tangent delta (tan δ) values of the Inventive Examples 1 and 3 have decreased compared to the Control Sample which indicates a lower hysteresis. Tangent Delta remains flat for Inventive Example 2. The hot rebound indicator indicates a higher rebound resilience for Inventive Example 1 compared with the Control Sample. Inventive Examples 2 and 3 show the same value as the Control Sample. While the Control Sample and the Inventive Example 3 have the same Shore A hardness, Inventive Examples 1 and 2 have a higher Shore A hardness which may also support a higher cornering stiffness.

TABLE 2

| Ingredient | Control Sample | Inventive Example 1 | Inventive Example | Inventive Example 3 |
|---|---|---|---|---|
| Tan delta[a] | 0.074 | 0.070 | 0.074 | 0.073 |
| Rebound (hot)[b] | 73 | 75 | 73 | 73 |
| Shore A hardness[c] | 52 | 54 | 60 | 52 |

[a] Tan delta has been obtained at 100° C. with an RPA 2000™ Rubber Process Analyzer of the company Alpha Technologies, based on ASTM D5289.
[b] Rebound at 100° C. has been measured on a Zwick Roell™ 5109 rebound resilience tester according to DIN 53512 at the given temperature.
[c] Shore A hardness has been determined according to ASTM D2240 or equivalent.

Below TABLE 3 discloses tire test results for tires equipped with a tread comprising compositions according to one of the Control Sample and Inventive Examples 1 to 3 as disclosed in TABLE 1. The results for the maximum lateral force (or peak lateral force) are normalized to a reference tire having a performance indicator of 1.00, wherein the maximum lateral force is the force which a tire can laterally build up under a given load (here maximum load) when increasing the slip angle of the tire at a given speed. The testing conditions have been the same for the tires comprising treads with the Control compositions and the Inventive Example compositions. In particular, the tires were tested at constant speed and increasing slip angle. At a certain slip angle, the lateral force exerted by the tire stops increasing which is the maximum lateral force. Cornering stiffness, as also shown in TABLE 2, is the ratio of lateral force and slip angle determined at the linear section of the lateral force vs. slip angle curve at limited slip angles.

TABLE 3

| Ingredient | Control Sample | Inventive Example | Inventive Example | Inventive Example |
|---|---|---|---|---|
| Maximum lateral force (at 70% load index) | 1.00 | 0.95 | 0.98 | 0.95 |
| Cornering stiffness coefficient (at 70% load index) | 0.295 | 0.299 | 0.314 | 0.296 |

Further investigations of the inventors have shown that other tested state of the art tread compositions have resulted in maximum lateral force value 1.06 at 100% load.

As shown above, the tires of the Inventive Examples show a lower maximum lateral force value compared with the Control Sample. In particular, such low maximum lateral force values are desirable for vehicles with a relatively high center of gravity such as for SUVs, as a limited maximum lateral force supports avoidance of rollovers. In particular, such a tire will start to slide at a certain maximum slip angle instead of building up an even high lateral force under increasing slip angle which could under extreme cornering maneuvers provoke a rollover condition.

At the same time, the Inventive Examples exhibit a higher cornering stiffness coefficient than the Control Sample, which essentially means that the grip in cornering maneuvers at limited slip angles is further improved. A higher cornering stiffness coefficient is also desirable for an improved driving performance, also for modern SUVs.

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case, the above described embodiments and examples shall not be understood in a limiting sense.

The invention claimed is:

1. A rubber composition comprising:
   70 phr to 95 phr of diene based elastomer comprising 25 phr to 60 phr of a first diene based elastomer having a glass transition temperature within a range of −49° C. to −15° C., and 10 phr to 45 phr of a second diene based elastomer having a glass transition temperature within a range of 71° C. to −110° C.;
   5 phr to 30 phr of one or more of natural rubber and synthetic polyisoprene;
   40 phr to 70 phr of silica; and
   10 phr to 40 phr of at least one terpene resin having a weight average molecular weight Mw of at least 900 g/mol.

2. The rubber composition according to claim 1 wherein the resin has a weight average molecular weight Mw of at least 1100 g/mol.

3. The rubber composition according to claim 1 wherein the resin has a weight average molecular weight Mw of at least 2000 g/mol.

4. The rubber composition according to claim 1 wherein the resin has a softening point within a range of 100° C. to 150° C.

5. The rubber composition according to claim 1 wherein the resin has a softening point within a range of 110° C. to 140° C.

6. The rubber composition according to claim 1 wherein the resin is a beta terpene resin.

7. The rubber composition according to claim 1 wherein the rubber composition comprises from 45 to 65 phr of the silica.

8. The rubber composition according to claim 1 wherein the silica has a BET surface area within a range of 170 m$^2$/g to 260 m$^2$/g.

9. The rubber composition according to claim 1 wherein the silica comprises a BET surface area within a range of 210 m$^2$/g to 260 m$^2$/g.

10. The rubber composition according to claim 1 further comprising one or more of:
    from 0.1 phr to 10 phr of carbon black;
    from 4 phr to 7 phr of silane;

from 4 phr to 7 phr of a blocked mercapto silane; and
from 0 phr to 10 phr of oil.

11. The rubber composition according to claim 1 comprising
- 35 phr to 50 phr of the first diene based elastomer, wherein the first diene based elastomer is a first styrene butadiene rubber having a glass transition temperature within a range of −49° C. to −15° C.;
- 25 phr to 40 phr of the second diene based elastomer comprising one or more of polybutadiene and a second styrene butadiene rubber; and
- 10 phr to 25 phr of natural rubber or synthetic polyisoprene.

12. The rubber composition according to claim 1 wherein the first diene based elastomer is a styrene butadiene rubber comprising at least one functional group configured for the coupling to the silica.

13. The rubber composition according to claim 12 wherein the functional group is selected from one or more of polysiloxy, alkylsiloxy, aminoalkylsiloxy, tin amino, amino siloxane and amino silane groups.

14. The rubber composition of claim 11 wherein the first styrene butadiene rubber is end chain functionalized with an amino silane group and wherein the second styrene butadiene rubber is end chain functionalized with an amino siloxane group.

15. The rubber composition of claim 11 wherein the first styrene butadiene rubber has a glass transition temperature within a range of −25° C. to −35° C. and the second styrene butadiene rubber has a glass transition temperature within a range of −51° C. and −70° C.

16. The rubber composition of claim 11 wherein the second diene based elastomer is a polybutadiene having a glass transition temperature within a range of −104° C. and −110° C.

17. The rubber composition of claim 1 comprising from 15 phr to 30 phr of the resin.

18. The rubber composition of claim 1 wherein the glass transition temperature of the rubber composition first diene based elastomer is within a range of −25° C. to −15° C.

19. A tire comprising the rubber composition according to claim 1.

20. The tire of claim 19, wherein the tire comprises a tread including said rubber composition.

* * * * *